United States Patent
Yamazaki et al.

(10) Patent No.: US 10,462,677 B2
(45) Date of Patent: Oct. 29, 2019

(54) TERMINAL DEVICE, COMMUNICATION METHOD, AND PROGRAM

(71) Applicant: SHARP KABUSHIKI KAISHA, Sakai, Osaka (JP)

(72) Inventors: Atsushi Yamazaki, Sakai (JP); Katsutoshi Ishikura, Sakai (JP); Hideaki Shinmei, Sakai (JP); Tamotsu Satoh, Sakai (JP); Hiroyuki Saga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/749,467

(22) PCT Filed: Jul. 13, 2016

(86) PCT No.: PCT/JP2016/070738
§ 371 (c)(1),
(2) Date: Jan. 31, 2018

(87) PCT Pub. No.: WO2017/033609
PCT Pub. Date: Mar. 2, 2017

(65) Prior Publication Data
US 2018/0227767 A1    Aug. 9, 2018

(30) Foreign Application Priority Data

Aug. 24, 2015  (JP) .................................. 2015-164797

(51) Int. Cl.
*H04W 36/20* (2009.01)
*H04W 84/12* (2009.01)
(Continued)

(52) U.S. Cl.
CPC .......... *H04W 16/14* (2013.01); *H04W 24/08* (2013.01); *H04W 36/20* (2013.01);
(Continued)

(58) Field of Classification Search
None
See application file for complete search history.

(56) References Cited

U.S. PATENT DOCUMENTS

2009/0257398 A1* 10/2009 Koyanagi ............. H04W 48/18
  370/331
2011/0312288 A1   12/2011 Fu et al.
(Continued)

FOREIGN PATENT DOCUMENTS

| EP | 3240346 A1 | 11/2017 |
| JP | 2013-535139 A | 9/2013 |
| WO | 2016/103533 A1 | 6/2016 |

*Primary Examiner* — Ajit Patel
(74) *Attorney, Agent, or Firm* — ScienBiziP, P.C.

(57) ABSTRACT

A terminal device includes: a communication unit configured to communicatively connect with a first network using a first frequency band or a second frequency band; a detection unit configured to detect communication of a second network that is performed using the second frequency band; an interference avoidance unit configured to perform a process of avoiding radio interference by the second network; and a control unit configured to perform control such that the interference avoidance unit performs the process of avoiding radio interference by the second network band in a case that an identifier identifying communication of the second network detected by the detection unit includes a specific identifier.

8 Claims, 4 Drawing Sheets

(51) Int. Cl.
*H04W 36/06* (2009.01)
*H04W 16/14* (2009.01)
*H04W 24/08* (2009.01)
*H04W 72/04* (2009.01)

(52) U.S. Cl.
CPC ........ *H04W 72/0453* (2013.01); *H04W 36/06* (2013.01); *H04W 84/12* (2013.01)

(56) References Cited

U.S. PATENT DOCUMENTS

| | | | | |
|---|---|---|---|---|
| 2013/0057591 | A1* | 3/2013 | Sugiyama | H04W 48/20 345/671 |
| 2014/0341200 | A1* | 11/2014 | Vukich | H04W 48/16 370/338 |
| 2015/0189462 | A1* | 7/2015 | Fujii | H04W 4/046 455/41.2 |
| 2016/0353495 | A1* | 12/2016 | Smadi | H04W 76/14 |
| 2017/0034832 | A1* | 2/2017 | Karimli | H04W 16/14 |
| 2018/0124807 | A1* | 5/2018 | Smith | H04W 16/14 |

\* cited by examiner

FIG. 3

| No. | CHARACTER STRING | SEARCH TYPE |
|---|---|---|
| 1 | AAA001 | EXACT MATCH |
| 2 | AAA002 | EXACT MATCH |
| 3 | BBB | FRONT MATCH |
| 4 | 001 | BACK MATCH |
| 5 | ABC | INCLUDE CHARACTER STRING |
| 6 | XYZ | EXCLUDE CHARACTER STRING |

TERMINAL DEVICE, COMMUNICATION METHOD, AND PROGRAM

TECHNICAL FIELD

The present invention relates to a terminal device, a communication method, and a program.

Priority is claimed on Japanese Patent Application No. 2015-164797, filed Aug. 24, 2015, the content of which is incorporated herein by reference.

BACKGROUND ART

Along with an increasing demand for data communication, use of license assisted access using LTE (LAA) is being studied to improve communication speed and communication efficiency. LAA is a communication method using long term evolution (LTE: registered trademark) using an unlicensed band. LTE is a standard that speeds up data communication of third generation (3G) mobile phones and is also called 3.9G.

Upon detecting the presence of another network communication, for example, wireless local area network (LAN) communication which uses an unlicensed band, a base station using LAA needs to perform communication, for example, by avoiding a frequency band used for the wireless LAN communication to prevent the occurrence of radio interference. Therefore, upon detecting radio interference between LAA and wireless LAN communication, a wireless device described in Patent Document 1 makes a handover request to an LAA communication base station and changes a frequency band used for LAA. Thus, the wireless device performs LAA communication using a frequency band which does not cause radio interference with the wireless LAN communication.

PRIOR ART DOCUMENT

[Patent Document]
[Patent Document 1]
Published Japanese Translation No. 2013-535139 of the PCT International Publication

SUMMARY OF THE INVENTION

Problem to be Solved by the Invention

Incidentally, for example, a number of wireless LAN access points may be scattered around public spaces including public parks or facilities. When radio interference between LAA and wireless LAN communication is detected, the wireless device according to the related art changes a frequency band used for LAA. However, in such an environment, the frequency band changed to may again cause radio interference with another wireless LAN communication. Thus, the wireless device according to the related art may successively make handover requests to the LAA base station and therefore has a problem of causing an unnecessary load in both the LAA communication base station and the wireless device.

Some aspects of the present invention have been made in view of the above points and provide a terminal device, a communication method, and a program which can perform communication while reducing a load on a communication base station and the terminal device due to unnecessary interference avoidance means.

Means for Solving the Problems (1) Some aspects of the present invention is made to solve the above-described problem. One aspect of the present invention is a terminal device including: a communication unit configured to communicatively connect with a first network using a first frequency band or a second frequency band; a detection unit configured to detect communication of a second network that is performed using the second frequency band; an interference avoidance unit configured to perform a process of avoiding radio interference in the second frequency band; and a control unit configured to perform control such that the interference avoidance unit performs the process of avoiding radio interference in the second frequency band in a case that an identifier identifying communication of the second network detected by the detection unit includes a specific identifier.

(2) In addition, one aspect of the present invention is the terminal device according to (1), wherein, in a case that a first channel in the second frequency band used for communication of the first network and a second channel in the second frequency band used for communication of the second network conflict with each other, the interference avoidance unit is configured to cause the communication unit to stop using the first channel and to switch to another channel.

(3) In addition, one aspect of the present invention is the terminal device according to (1), wherein the interference avoidance unit is configured to cause the communication unit to stop using the second frequency band in a communicative connection with the first network.

(4) In addition, one aspect of the present invention is a communication method including: communicatively connecting with a first network using a first frequency band or a second frequency band; detecting communication of a second network that is performed using the second frequency band; performing a process of avoiding radio interference in the second frequency band; and performing control such that the process of avoiding radio interference in the second frequency band is performed in the interference avoidance in a case that an identifier identifying communication of the second network detected in the detection includes a specific identifier.

(5) In addition, one aspect of the present invention is a program causing a computer to execute: communicatively connecting with a first network using a first frequency band or a second frequency band; detecting communication of a second network that is performed using the second frequency band; performing a process of avoiding radio interference in the second frequency band; and performing control such that the process of avoiding radio interference in the second frequency band is performed in the interference avoidance in a case that an identifier identifying communication of the second network detected in the detection includes a specific identifier.

Effect of the Invention

According to some aspects of the present invention, it is possible to perform communication while reducing a load on a communication base station and a terminal device due to unnecessary interference avoidance means.

BRIEF DESCRIPTION OF THE DRAWINGS

FIG. 3 is a diagram showing a configuration of a registered SSID list in the communication system according to the present embodiment.

EMBODIMENTS FOR CARRYING OUT THE INVENTION

Embodiments

Embodiments of the present invention will be described with reference to the drawings.

Figure 1:
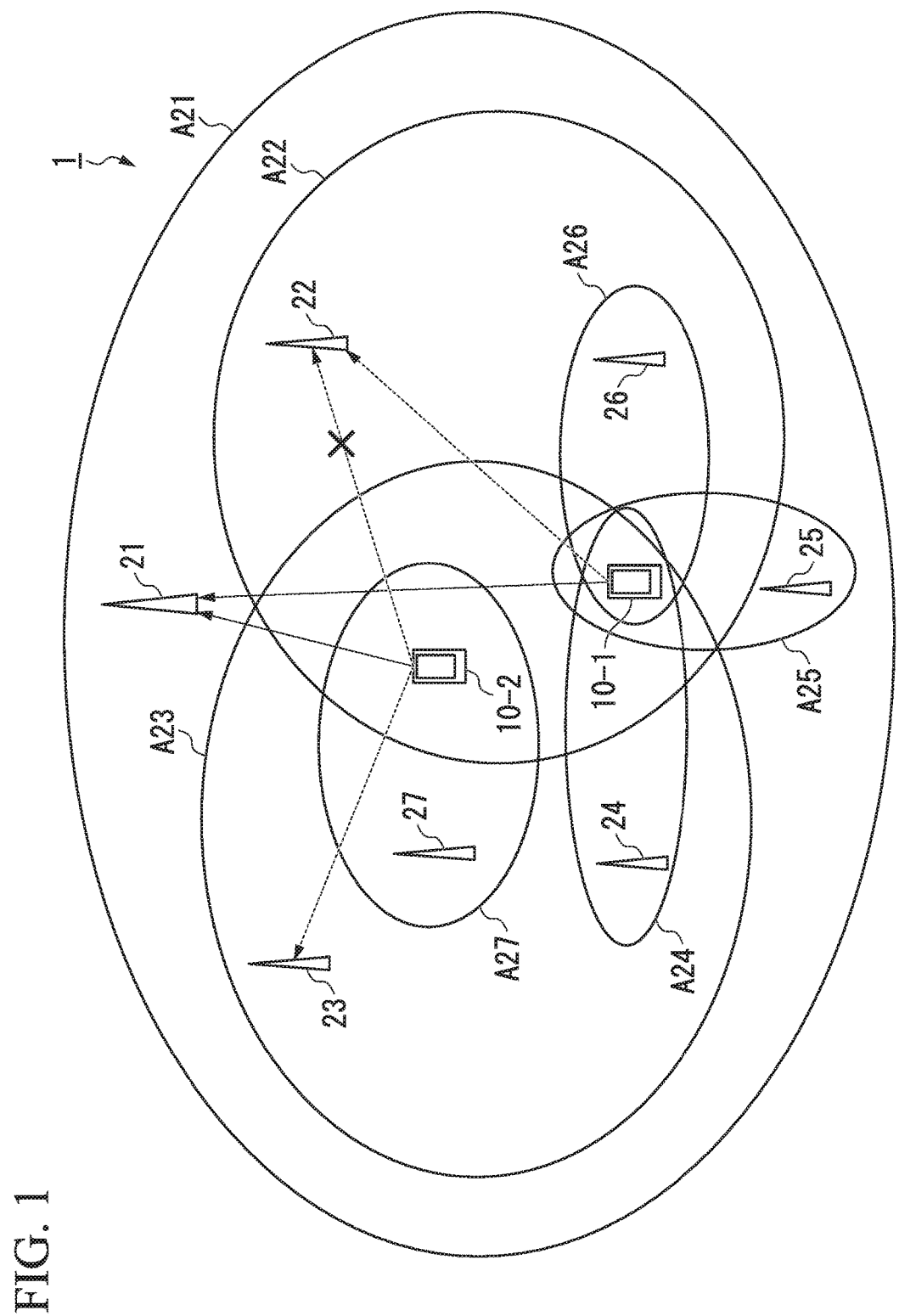
FIG. 1 is a schematic diagram showing a configuration of a communication system according to the present embodiment.

FIG. 1 is a schematic diagram showing a configuration of a communication system according to the present embodiment.

The communication system 1 includes terminal devices 10 (10-1, 10-2), a first communication base station 21, a second communication base station 22, a second communication base station 23, a wireless LAN access point 24, a wireless LAN access point 25, a wireless LAN access point 26, and a wireless LAN access point 27.

The terminal devices 10 (10-1, 10-2) are each an LTE communication (first network)-compliant terminal device which is also compliant with an LAA communication scheme. The terminal device 10 (10-1, 10-2) can detect an access point of wireless LAN communication (a second network) by receiving radio waves transmitted from the access point. The terminal device 10 (10-1, 10-2) is formed as, for example, a smartphone, a tablet terminal, or a personal computer.

The first communication base station 21 is a communication base station that communicatively connects with the terminal devices 10 (10-1, 10-2) by LTE communication using a licensed band (a first frequency band).

The second communication base station 22 and the second communication base station 23 are each a communication base station that communicatively connects with the terminal devices 10 (10-1, 10-2) by LTE communication using an unlicensed band (a second frequency band).

The first communication base station 21 and the second communication base station 22 are formed as, for example, an evolved Node B (eNodeB). The eNodeB is a wireless communication base station compliant with LTE wireless communication.

The licensed band is a frequency band that can be used with approval by authorities and the unlicensed band is a frequency band (for example, 5 GHz band) that can be used without requiring approval by authorities.

The second communication base station 22 is a communication base station that establishes a communicative connection using channel A (for example, channel 36 of the 5 GHz band). The second communication base station 23 is a communication base station that establishes a communicative connection using channel B (for example, channel 40 of the 5 GHz band).

Channels are frequency bands into which the frequency band (for example, the 5 GHz band) used by the communication base stations is divided. Using different channels (for example, channels 36, 40, 44, 48, 52, 56, 60, 64, 100, 104, 108, 112, 116, 120, 124, 128, 132, 136, and 140) for a plurality of communicative connections makes it possible to simultaneously establish a plurality of communicative connections without causing radio interference in the same frequency band.

As described above, the terminal devices 10 (10-1, 10-2) are compliant with the LAA communication scheme. LAA (also called LTE-U) is a communication scheme for performing communication based on LTE or LTE-advanced (LTE-A) using an unlicensed band which is also used for wireless LAN communication or the like. The introduction of LAA is being studied in the 3rd generation partnership project (3GPP) which is a standardization project for mobile communication systems.

LAA is assumed to be used in combination with LTE communication that uses a licensed band. While maintaining LTE communication using a licensed band, LAA can also realize so-called "carrier aggregation" which uses a combination of a line using a licensed band and a line using an unlicensed band when communication using the unlicensed band is possible.

The wireless LAN access point 24, the wireless LAN access point 25, the wireless LAN access point 26, and the wireless LAN access point 27 are devices that communicate with wireless LAN terminals (not shown) by wireless LAN communication. The wireless LAN access point 24, the wireless LAN access point 25, the wireless LAN access point 26, and the wireless LAN access point 27 are formed as, for example, wireless LAN routers. Wireless LAN communication establishes a communicative connection using an unlicensed band.

The wireless LAN access point 24 is an access point that establishes a communicative connection using the channel A. The wireless LAN access point 25 is an access point that establishes a communicative connection using the channel B. The wireless LAN access point 26 is an access point that establishes a communicative connection using the channel C. The wireless LAN access point 27 is an access point that establishes a communicative connection using the channel A.

Unlicensed bands used by the second communication base station 22 and the second communication base station 23 and unlicensed bands used by the wireless LAN access point 24, the wireless LAN access point 25, the wireless LAN access point 26, and the wireless LAN access point 27 include a common frequency band (for example, a 5 GHz band).

Therefore, there is a possibility that LTE communication by the second communication base station 22 and the second communication base station 23 and wireless LAN communication by the wireless LAN access point 24, the wireless LAN access point 25, the wireless LAN access point 26, and the wireless LAN access point 27 simultaneously use a common (conflicting) channel in the common frequency band.

Specifically, both LTE communication by the second communication base station 22 and wireless LAN communication by the wireless LAN access point 24 establish communicative connections using the channel A. Therefore, there is a possibility that LTE communication by the second communication base station 22 and wireless LAN communication by the wireless LAN access point 24 simultaneously use the common channel (channel A).

Similarly, there is a possibility that LTE communication by the second communication base station 22 and wireless LAN communication by the wireless LAN access point 27 simultaneously use the common channel (channel A).

Similarly, there is a possibility that LTE communication by the second communication base station 23 and wireless LAN communication by the wireless LAN access point 25 simultaneously use the common channel (channel B).

As described above, radio interference may occur when LTE communication and wireless LAN communication simultaneously use a common channel in the common frequency band. Therefore, LTE communication and wireless LAN communication need to establish communicative connections using different channels.

In FIG. 1, a cell formed by the first communication base station 21 is a cell A21. The term "cell" refers to an area covered by a communication base station. Therefore, the terminal device 10-1 and the terminal device 10-2 located in the cell A21 can communicatively connect with the first communication base station 21 by LTE communication using a licensed band.

Similarly, a cell formed by the second communication base station 22 is a cell A22. Therefore, the terminal devices 10-1 and 10-2 located in the cell A22 can communicatively connect with the second communication base station 22 by LTE communication using an unlicensed band (LAA).

Specifically, the first communication base station 21 forms a primary cell (PCELL) of LAA and the second communication base station 22 forms a secondary cell (SCELL) of LAA compliant with the primary cell. The primary cell referred to here is a cell in which both data communication and control information communication are performed. The secondary cell is a cell in which data communication is performed using control information communicated in the primary cell. For example, the primary and secondary cells are primary and secondary cells of LTE-A. The second communication base station 22 forms a secondary cell using an unlicensed band.

Similarly, a cell formed by the second communication base station 23 is a cell A23. Therefore, the terminal device 10-1 and the terminal device 10-2 located in the cell A23 can communicatively connect with the second communication base station 23 by LTE communication using an unlicensed band (LAA).

The areas covered by the wireless LAN access point 24, the wireless LAN access point 25, the wireless LAN access point 26, and the wireless LAN access point 27 are a wireless LAN area A24, a wireless LAN area A25, a wireless LAN area A26, and a wireless LAN area A27. For example, a wireless LAN terminal (not shown) located in the wireless LAN area A24 can communicatively connect with the wireless LAN access point 24 by wireless LAN communication.

Similar to the second communication base station 22 and the second communication base station 23, the wireless LAN access point 24, the wireless LAN access point 25, the wireless LAN access point 26, and the wireless LAN access point 27 communicatively connect with wireless LAN terminals (not shown) using an unlicensed band (for example, a 5 GHz band).

As shown in FIG. 1, the terminal device 10-1 is located in the cell A21, the cell A22, the cell A23, the wireless LAN area A24, the wireless LAN area A25, and the wireless LAN area A26 and is located outside the wireless LAN area A27. The terminal device 10-1 can perform LAA communication which is a combination of LTE communication using a licensed band through a communicative connection with the first communication base station 21 and LTE communication using an unlicensed band through a communicative connection with the second communication base station 22 or with the second communication base station 23.

As shown in FIG. 1, the terminal device 10-2 is located in the cell A21, the cell A22, the cell A23, and the wireless LAN area A27 and is located outside the wireless LAN area A24, the wireless LAN area A25, and the wireless LAN area A26. Similar to the terminal device 10-1, the terminal device 10-2 can perform LAA communication which is a combination of LTE communication using a licensed band through a communicative connection with the first communication base station 21 and LTE communication using an unlicensed band through a communicative connection with the second communication base station 22 or with the second communication base station 23.

The terminal devices 10 (10-1 and 10-2) previously store information indicating wireless LAN communication which desirably does not cause radio interference with LAA communication performed by the same terminal devices 10 (10-1 and 10-2). Specifically, the terminal devices 10 (10-1 and 10-2) previously store a list of identifiers identifying wireless LAN access points corresponding to specific wireless LAN communication. The identifiers are, for example, service set identifiers (SSIDs).

For example, a list stored in each of the terminal devices 10 (10-1 and 10-2) (hereinafter referred to as a registered SSID list) includes an SSID identifying the wireless LAN access point 27 and does not include SSIDs identifying the wireless LAN access point 24, the wireless LAN access point 25, and the wireless LAN access point 26.

When any detected SSID is included in the registered SSID list, each of the terminal devices 10 (10-1 and 10-2) checks whether or not a channel (a second channel) used for wireless LAN communication corresponding to the SSID conflicts with a channel (a first channel) used for LAA communication performed by the terminal device 10 (10-1 and 10-2). When the result of checking is that the two channels conflict with each other, each of the terminal devices 10 (10-1 and 10-2) makes a handover request to the LAA communication base station.

For example, the terminal device 10-1 communicatively connects with the first communication base station 21 and the second communication base station 22 to perform LAA communication. The terminal device 10-1 detects SSIDs and channels corresponding respectively to wireless LAN access points that form the wireless LAN area A24, the wireless LAN area A25, and the wireless LAN area A26 in which the terminal device 10-1 is located.

The terminal device 10-1 then confirms that none of the detected SSIDs is included in the registered SSID list. In this case, the terminal device 10-1 does not make a handover request to the second communication base station 22.

Further, for example, the terminal device 10-2 communicatively connects with the first communication base station 21 and the second communication base station 22 to perform LAA communication. The terminal device 10-2 detects an SSID and a channel corresponding to the wireless LAN access point 27 forming the wireless LAN area A27 in which the terminal device 10-2 is located.

The terminal device 10-2 then confirms that the detected SSID is included in the registered SSID list. The terminal device 10-2 also confirms that the detected channel and the channel used for communicative connection with the second communication base station 22 conflict with each other (i.e., both are the channel A). In this case, the terminal device 10-2 makes a handover request to the second communication base station 22. Then, the second communication base station 22 performs a handover of the terminal device 10-2 to the second communication base station 23 using a non-conflicting channel (channel B). This allows the terminal device 10-2 to avoid radio interference between wireless LAN communication by the wireless LAN access point 27 and LAA communication performed by the terminal device 10-2 itself.

Thus, by previously storing the registered SSID list, the terminal devices 10 (10-1 and 10-2) can arbitrarily preset wireless LAN communication which desirably does not cause radio interference with LAA communication performed by the same terminal devices 10 (10-1 and 10-2).

For example, the following processes are performed when a configuration such that a handover request is made to an LAA communication base station only when an SSID previously stored in a registered SSID list is detected is not employed as in the related art. The terminal device 10-1 detects the wireless LAN access point 24, the wireless LAN access point 25, and the wireless LAN access point 26. The terminal device 10-1 confirms that channel A is used by the detected wireless LAN access point 24 and conflicts with a channel used for communicative connection with the second communication base station 23. The terminal device 10-1 then makes a handover request to the second communication base station 22. The second communication base station 22 then performs a handover of the terminal device 10-1 to the second communication base station 23.

However, the second communication base station 23 is a communication base station that establishes a communicative connection using the channel B. The terminal device 10-1 is also located in the wireless LAN area A25 in which wireless LAN communication is performed using the channel B. Thus, channel confliction occurs again and therefore it is not possible to avoid radio interference and the terminal device 10-1 again makes a handover request to the second communication base station 23.

Thus, the terminal device 10-1 may successively make handover requests in the environment in which many wireless LAN access points are scattered. However, according to the present embodiment, a handover request is made to an LAA communication base station only when an SSID previously registered in a registered SSID list is detected, thereby reducing a load on the communication base station and the terminal device due to useless handovers.

(Configuration of Terminal Device)

Next, a configuration of the terminal device 10 (10-1, 10-2) will be described in detail.

Figure 2:
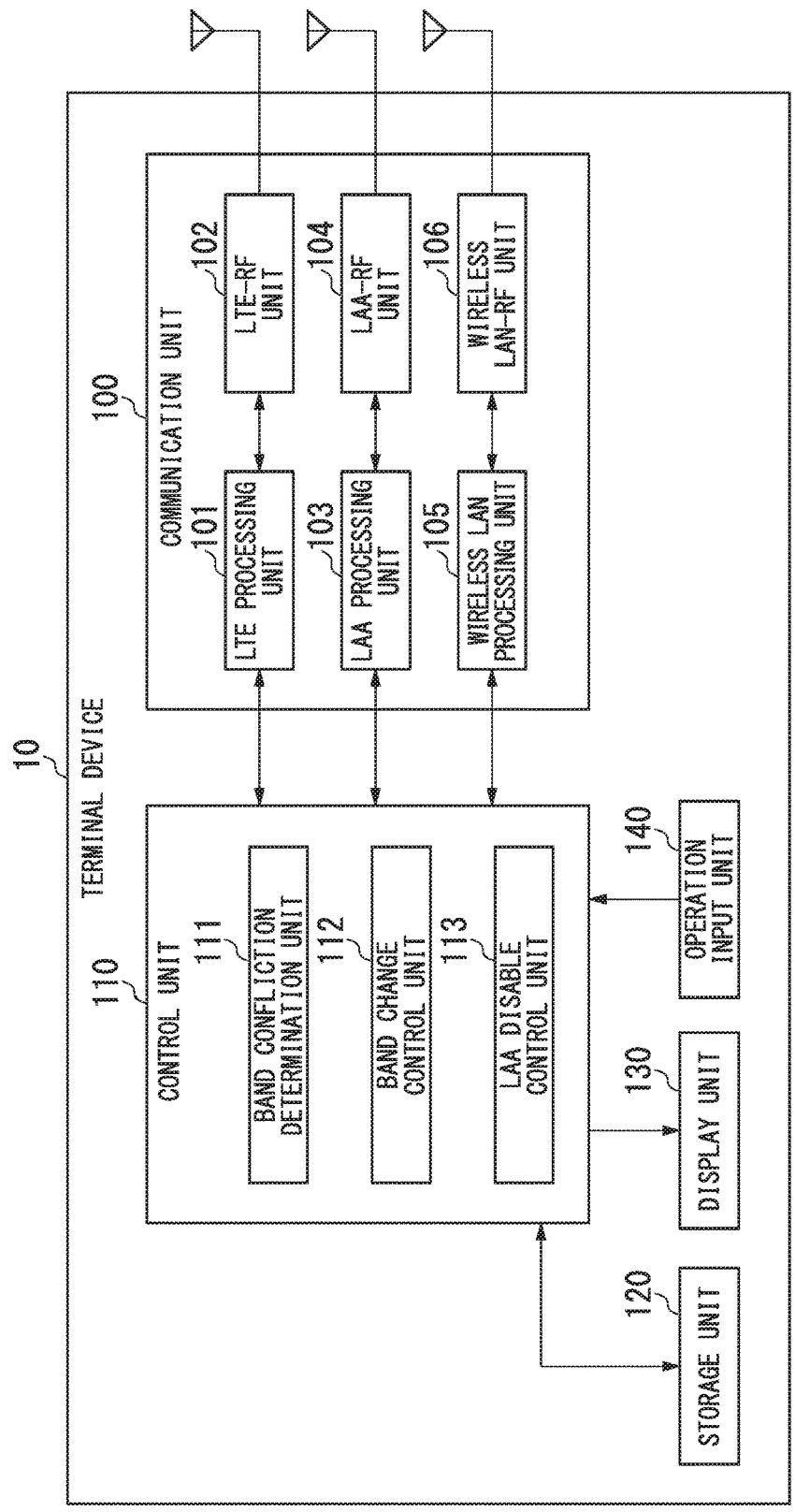
FIG. 2 is a block diagram showing a configuration of a terminal device in the communication system according to the present embodiment.

FIG. 2 is a block diagram showing the configuration of the terminal device according to the present embodiment.

The terminal device 10 includes a communication unit 100, a control unit 110, a storage unit 120, a display unit 130, and an operation input unit 140.

The communication unit 100 establishes communicative connections with the first communication base station 21, the second communication base station 22, and the second communication base station 23, detection of channels and access points of wireless LAN communication, and the like. The communication unit 100 includes an LTE processing unit 101, an LTE-RF unit 102, an LAA processing unit 103, an LAA-RF unit 104, a wireless LAN processing unit 105, and a wireless LAN-RF unit 106.

The control unit 110 controls various operations of the terminal device 10. The control unit 110 includes a band confliction determination unit 111, a band change control unit 112, and an LAA disable control unit 113.

The LTE processing unit 101 transmits and receives a variety of data to and from the first communication base station 21 via the LTE-RF unit 102 and an antenna using an LTE communication scheme.

The LTE-RF unit 102 performs conversion between an intermediate frequency signal indicating data which is input/output between the LTE processing unit 101 and the LTE-RF unit 102 and a high frequency signal which is input/output between the antenna and the LTE-RF unit 102.

The LAA processing unit 103 transmits and receives a variety of data to and from the second communication base station 22 and the second communication base station 23 via the LAA-RF unit 104 and an antenna using an LAA communication scheme.

The LAA-RF unit 104 performs conversion between an intermediate frequency signal indicating data which is input/output between the LAA processing unit 103 and the LAA-RF unit 104 and a high frequency signal which is input/output between the antenna and the LAA-RF unit 104.

The wireless LAN processing unit 105 (a detection unit) attempts to detect nearby access points of wireless LAN communication at regular intervals (for example, at intervals of 10 seconds) via the wireless LAN-RF unit 106 and the antenna. The wireless LAN processing unit 105 outputs a detected service set identifiers (SSID) list (not shown) which is a list of SSIDs of the detected access points to the band confliction determination unit 111 which will be described later. Even when no SSIDs have been acquired, the wireless LAN processing unit 105 outputs an empty detected SSID list to the band confliction determination unit 111 which will be described later.

The wireless LAN-RF unit 106 converts a high frequency signal input from the antenna into an intermediate frequency signal indicating an SSID(s) and a channel(s) and outputs the intermediate frequency signal to the wireless LAN processing unit 105.

The band confliction determination unit 111 determines whether to perform a handover to avoid radio interference.

Specifically, the band confliction determination unit 111 compares SSIDs included in the detected SSID list acquired from the wireless LAN processing unit 105 with SSIDs included in the registered SSID list stored in the storage unit 120. When the registered SSID list includes at least one SSID matching any of the SSIDs included in the detected SSID list, the band confliction determination unit 111 checks whether or not a communicative connection based on LAA has been established by the LAA processing unit 103 via the LAA-RF unit. When a communicative connection based on LAA has been established, the band confliction determination unit 111 checks whether or not a channel used by a wireless LAN access point corresponding to the matching SSID in both the detected SSID list and the registered SSID list conflicts with a channel used for LAA communication that the LAA processing unit 103 is performing via the LAA-RF unit 104. When the channels conflict with each other, the band confliction determination unit 111 determines to perform a handover and outputs a signal indicating a handover request to the band change control unit 112. On the other hand, the band confliction determination unit 111 determines not to perform a handover when the registered SSID list does not include any SSIDs matching the SSIDs included in the detected SSID list, or when a communicative connection based on LAA has not been established, or when the channel used by the wireless LAN access point and the channel used for LAA communication do not conflict with each other.

The band change control unit 112 (an interference avoidance unit) performs control regarding a handover request to the second communication base station 22 or the second communication base station 23. The band change control unit 112 transmits information indicating a handover request to the second communication base station 22 or the second communication base station 23 via the LAA processing unit 103 and the LAA-RF unit 104.

The LAA disable control unit 113 controls a process of disabling an LAA communication function.

The storage unit 120 previously stores a registered SSID list which is a list of wireless LAN SSIDs. The registered SSID list is a list of SSIDs corresponding to access points of wireless LAN communication which may cause radio interference with LAA communication. Details of the configuration of the registered SSID list will be described later.

The storage unit 120 is configured to include a storage medium, for example, a hard disk drive (HDD), a flash memory, an electrically erasable programmable read only memory (EEPROM), a read only memory (ROM), a random access read/write memory (RAM), or any combination thereof.

The display unit 130 displays a variety of information. The display unit 130 includes a display, for example, a liquid crystal display or an organic electroluminescence (EL) display.

The operation input unit 140 receives various operation inputs from the user of the terminal device 10. The operation input unit 140 is configured to include an operation input member, for example, operation buttons or a keyboard.

SSIDs are registered in the registered SSID list, for example, by the user of the terminal device 10 inputting them via the operation input unit 140 while referring to the display unit 130.

(Configuration of Registered SSID List)

Next, a configuration of the registered SSID list will be described in detail.

FIG. 3 is a diagram showing the configuration of the registered SSID list according to the present embodiment.

As shown, the registered SSID list is a two-dimensional table having three columns for entries for "No.," "character string," and "search type." Each row of the registered SSID list indicates an SSID matching condition. The entries for "No." may be omitted and the registered SSID list may be a table in which at least "character string" and "search type" are associated with each other. For example, the registered SSID list may be a two-dimensional table having two columns for entries for "character string" and "search type."

Numbers assigned to matching conditions to identify them are stored as the entry for "No." All or a part of character strings of SSIDs are stored as the entry for "character string." Search rules of character strings are stored as the entry for "search type."

For example, the values of the entries in the first row of the registered SSID list are "No. 1," "AAA001," and "exact match." That is, the first row of the registered SSID list indicates a condition that a character string of an SSID exactly matches "AAA001." The third row of the registered SSID list indicates a condition that a character string of an SSID matches "BBB" at the start. Thus, matching conditions of the character string of the SSID are not limited to the condition in which an SSID included in the detected SSID list and an SSID included in the registered SSID list "exactly match," and it is also possible to apply conditions such as "front match (i.e., match at the start)," "back match (i.e., match at the end)," "include a (specific) character string," or "exclude a (specific) character string."

(Operation of Receiving Device)

Next, an operation of the terminal device 10 will be described.

Figure 4:
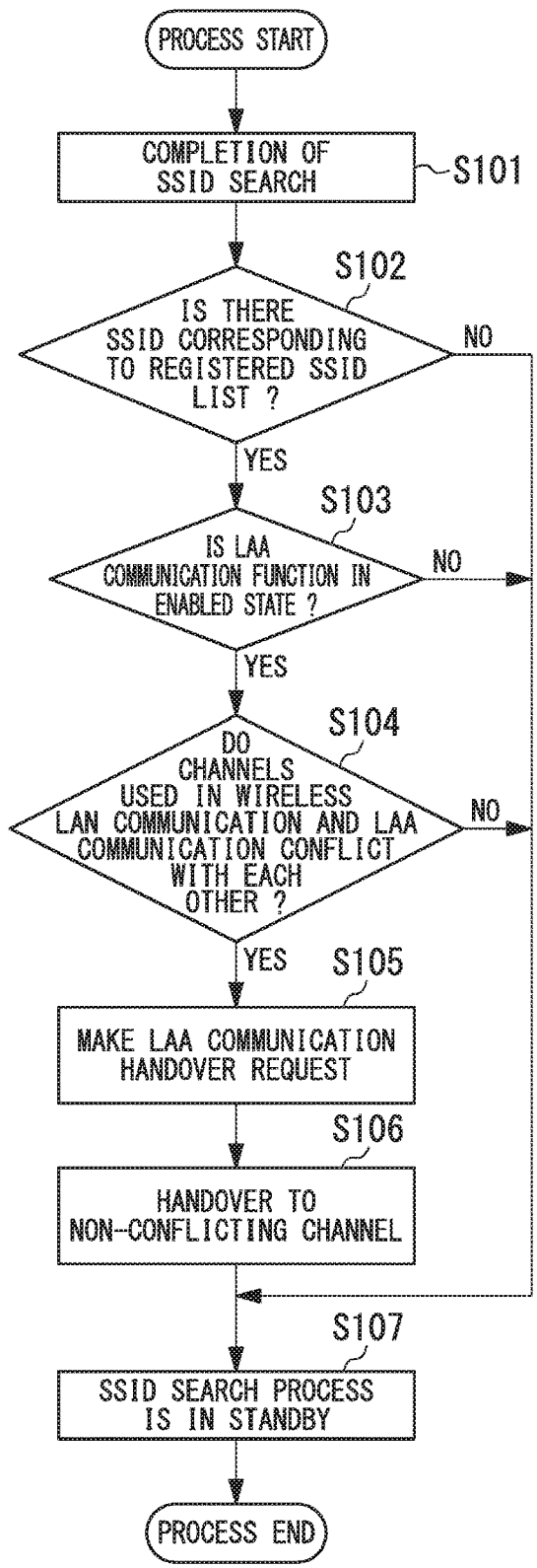
FIG. 4 is a flowchart showing an operation of the terminal device in the communication system according to the present embodiment.

FIG. 4 is a flowchart showing the operation of the terminal device according to the present embodiment.

This flowchart starts when the wireless LAN processing unit 105 attempts to detect nearby access points of wireless LAN communication.

(Step S101) Upon completing the detection of nearby access points of wireless LAN communication, the wireless LAN processing unit 105 outputs a detected SSID list to the band confliction determination unit 111. Thereafter, the process proceeds to step S102.

(Step S102) The band confliction determination unit 111 compares SSIDs included in the detected SSID list acquired from the wireless LAN processing unit 105 with SSIDs included in the registered SSID list stored in the storage unit 120. When at least one SSID included in the detected SSID list is included in the registered SSID list, the process proceeds to step S103. Otherwise, the process proceeds to step S107.

(Step S103) The control unit 110 checks whether the LAA communication function is in an enabled state or in a disabled state. That is, the control unit 110 checks whether a communicative connection has been established with the second communication base station 22 or the second communication base station 23 by the LAA processing unit 103 via the LAA-RF unit 104. When the LAA communication function is in an enabled state, the process proceeds to step S104. Otherwise, the process proceeds to step S107.

(Step S104) The control unit 110 checks whether or not a channel used for communicative connection with the second communication base station 22 or the second communication base station 23 conflicts with a channel used for wireless LAN communication corresponding to a matching SSID in both the detected SSID list and the registered SSID list which has been determined in step S102. If the channels conflict with each other, the process proceeds to step S105. Otherwise, the process proceeds to step S107.

(Step S105) The band change control unit 112 transmits information indicating a handover request to the second communication base station (to the second communication base station 22 or the second communication base station 23), with which a communicative connection has been established, via the LAA processing unit 103 and the LAA-RF unit 104. Thereafter, the process proceeds to step S106.

(Step S106) The LAA-RF unit 104 receives information indicating a response regarding the execution of a handover from the second communication base station. Then, the control unit 110 changes the communication base station, with which a communicative connection of LAA communication is to be established, to a new second communication base station to which a handover has been made. Thereafter, the process proceeds to step S107.

(Step S107) The control unit 110 waits until the wireless LAN processing unit 105 is caused to attempt again to detect nearby access points of wireless LAN communication after a predetermined period (for example, 10 seconds) elapses. Then, the process of this flowchart ends.

As described above, the terminal device 10 according to the present embodiment detects access points of wireless LAN communication, each of which uses an unlicensed band, and checks whether or not a specific SSID is included in SSIDs of the detected access points. If the result of checking is that a specific SSID is included, the terminal device 10 specifies a channel that is used for wireless LAN communication by a wireless LAN access point corresponding to the specific SSID. Then, the terminal device 10 checks whether or not the specified channel and a channel that the terminal device 10 itself is using for LAA communication conflict with each other. If the channels conflict with each other, the terminal device 10 makes a handover request to the LAA communication base station.

As described above, according to the present embodiment, only SSIDs corresponding to access points of wireless LAN communication which are not desired to cause radio interference with LAA communication are previously registered in the registered SSID list and therefore it is possible for the terminal device 10 to avoid making useless handover requests successively.

Thus, the terminal device 10 according to the present embodiment can perform communication while reducing a load on the communication base station and the terminal device due to unnecessary interference avoidance means.

Although the embodiment of the present invention has been described in detail above, specific configurations thereof are not limited to those described above and various design changes or the like can be made without departing from the gist of the present invention.

In the above embodiment, the interference avoidance means issues an LAA communication handover request from the terminal device 10 to the second communication base station (for example, to the second communication base station 22 or the second communication base station 23), but the present invention is not limited to this. For example, the interference avoidance means may make an LAA communication handover request to the first communication base station 21 which is a PCELL.

The interference avoidance means may also be implemented by the LAA disable control unit 113 disabling the LAA communication function by stopping power supply to the LAA processing unit 103 and the LAA-RF unit 104. The method of disabling the LAA communication function may be other than the method of stopping power supply. For example, the method of disabling the LAA communication function may be a method of disabling the communication function by software control or a method of disabling the communication function by physically turning off a switch.

The condition in which the terminal device 10 implements the interference avoidance means (for example, makes a handover request) is not limited to a condition based on both detection of a specific SSID and confliction of channels. For example, the condition for implementing the interference avoidance means may be a condition based on the detection of radio interference between LAA communication and wireless LAN communication. For example, it is also possible to employ a configuration such that the control unit 110 determines whether or not there is radio interference on the basis of changes in the intensity of radio waves of an unlicensed band received by the LAA-RF unit 104 and then performs control of disabling the LAA communication function.

It is to be noted that all or a part of the terminal device 10 in the above embodiment may be realized by a computer. In this case, all or a part of the terminal device 10 may be realized by recording a program for realizing a corresponding control function on a computer-readable recording medium and causing a computer system to read and execute the program recorded on the recording medium.

The "computer system" referred to here is a computer system provided in the terminal device 10 and includes hardware such as an OS or peripheral devices. The "computer-readable recording medium" refers to a storage medium such as a flexible disk, a magneto-optical disk, a ROM, a portable medium such as a CD-ROM, and a hard disk provided in a computer system.

The "computer readable recording medium" may also include that which dynamically holds a program for a short time, like a communication line in the case in which the program is transmitted via a communication line such as a telephone line or via a network such as the Internet and that which holds a program for a certain period of time, like a volatile memory in a computer system which serves as a server or a client in the same case. The above program may be one for realizing some of the above-described functions and may also be one which can realize the above-described functions in combination with a program already recorded in the computer system.

The terminal device 10 in the above embodiment may be realized as an integrated circuit such as large scale integration (LSI). Each functional block of the terminal device 10 may be individually implemented as a processor or some or all thereof may be integrated into a processor. The circuit integration method is not limited to LSI and the terminal device 10 may be realized as a dedicated circuit or a general-purpose processor. If a circuit integration technology replacing LSI emerges with advances in semiconductor technologies, an integrated circuit based on the technology may be used.

INDUSTRIAL APPLICABILITY

Some aspects of the present invention can be applied to a terminal device, a communication method, a program, or the like which need to perform communication while reducing a load on a communication base station and the terminal device due to unnecessary interference avoidance means.

DESCRIPTION OF THE REFERENCE SYMBOLS

1 Communication system
10 Terminal devices (10-1, 10-2)
21 First communication base station
22 Second communication base station
23 Second communication base station
24 Wireless LAN access point
25 Wireless LAN access point
26 Wireless LAN access point
27 Wireless LAN access point
100 Communication unit
101 LTE processing unit
102 LTE-RF unit
103 LAA processing unit
104 LAA-RF unit
105 Wireless LAN processing unit
106 Wireless LAN-RF unit
110 Control unit
111 Band confliction determination unit
112 Band change control unit
113 LAA disable control unit
120 Storage unit
130 Display unit
140 Operation input unit

The invention claimed is:

1. A terminal device comprising:
a communication circuitry configured to communicatively connect with a first network using a first frequency band or a second frequency band;
a detection circuitry configured to detect communication of a second network that is performed using the second frequency band; and
an interference avoidance circuitry configured to perform a process of avoiding radio interference in the second frequency band, wherein the interference avoidance circuitry is configured to control switching of a channel in the second frequency band to be used in connecting with the first network by the communication circuitry based on whether or not an identifier identifying an access point of the second network detected by the detection circuitry includes a specific identifier, wherein the specific identifier is a registered identification of the access point of the second network stored in the terminal device.

2. The terminal device according to claim 1,
wherein, in a case that the identifier identifying the access point of the second network detected by the detection circuitry includes the specific identifier, and in a case that a first channel in the second frequency band used for communication of the first network and a second channel in the second frequency band used for communication of the second network conflict with each other, the interference avoidance circuitry is configured to cause the communication circuitry to stop using the first channel and to switch to another channel.

3. The terminal device according to claim 1,
wherein the interference avoidance circuitry is configured to cause the communication circuitry to stop using the second frequency band in a communicative connection with the first network.

4. A communication method performed by a terminal device, the communication method comprising:
communicatively connecting with a first network using a first frequency band or a second frequency band;
detecting communication of a second network that is performed using the second frequency band; and
performing a process of avoiding radio interference in the second frequency band,
wherein, in the performing of the process of the avoiding radio interference, switching of a channel in the second frequency band to be used in the connecting with the first network is controlled based on whether or not an identifier identifying an access point of the second network detected in the detection includes a specific identifier, wherein the specific identifier is a registered identification of the access point of the second network stored in the terminal device.

5. A non-transitory computer readable medium of a terminal device storing a program executable by at least one processor of the terminal device, the program comprising sets of instructions for:
communicatively connecting with a first network using a first frequency band or a second frequency band;
detecting communication of a second network that is performed using the second frequency band; and
performing a process of avoiding radio interference in the second frequency band,
wherein, in the performing of the process of the avoiding radio interference, switching of a channel in the second frequency band to be used in the connecting with the first network is controlled based on whether or not an identifier identifying an access point of the second network detected in the detection includes a specific identifier, wherein the specific identifier is a registered identification of the access point of the second network stored in the terminal device.

6. The terminal device according to claim 1,
wherein the interference avoidance circuitry is configured not to make the communication circuitry switch to another channel in a case that the identifier identifying the access point of the second network detected by the detection circuitry does not include the specific identifier.

7. The terminal device according to claim 1,
wherein the specific identifier is included in a list previously stored in the terminal device, the list including at least one registered identifier.

8. The terminal device according to claim 7,
wherein the at least one registered identifier included in the list identifies access point which desirably does not cause radio interference with the first network.

* * * * *